United States Patent [19]

Dugge

[11] Patent Number: 4,884,723
[45] Date of Patent: Dec. 5, 1989

[54] HARD GASKET FOR RETROFIT INSTALLATION ON HOPPER OUTLET/HOPPER GASKET OUTLET

[75] Inventor: Richard H. Dugge, St. Louis, Mo.

[73] Assignee: ACF Industries, Incorporated, Earth City, Mo.

[21] Appl. No.: 363,441

[22] Filed: Jun. 7, 1989

Related U.S. Application Data

[63] Continuation of Ser. No. 41,839, Apr. 23, 1987, abandoned.

[51] Int. Cl.⁴ .................... B65D 53/00; B67D 5/06; F16J 15/10; F16J 15/12
[52] U.S. Cl. ........................... 222/542; 49/484; 49/494; 277/58; 277/166; 277/181; 277/182; 277/189; 277/206 R; 277/235 R; 285/368; 285/910; 406/145
[58] Field of Search ............... 277/12, 166, 183, 184, 277/209, 180, 235 R, 58, 181, 182, 189, 206 R; 49/304, 495, 469, 484, 493, 494; 406/128, 129, 145; 222/542; 285/368, 910

[56] References Cited

U.S. PATENT DOCUMENTS

| | | | |
|---|---|---|---|
| 2,019,031 | 10/1935 | Waples | 277/166 |
| 2,844,411 | 7/1958 | Aller | 406/145 |
| 3,029,480 | 4/1962 | Signorelli et al. | 49/484 X |
| 3,170,701 | 2/1965 | Hoover | 277/180 |
| 3,207,560 | 9/1965 | Brown | 406/128 X |
| 3,302,953 | 2/1967 | Glasgow | 277/180 |
| 3,362,568 | 1/1968 | Brandt et al. | 220/378 X |
| 3,659,896 | 5/1972 | Smith et al. | 52/403 X |
| 3,876,261 | 4/1975 | Jucins, Jr. et al. | 406/129 |
| 4,109,922 | 8/1978 | Martin | 277/180 |
| 4,110,948 | 9/1978 | Maier, Jr. | 52/403 X |
| 4,428,589 | 1/1984 | Reinsma | 277/DIG. 6 |
| 4,441,724 | 4/1984 | Taylor | 277/166 |
| 4,468,042 | 8/1984 | Pippert et al. | 277/166 X |

Primary Examiner—Allan N. Shoap
Attorney, Agent, or Firm—Polster, Polster and Lucchesi

[57] ABSTRACT

A gasket for a hopper outlet is disclosed, particularly well-suited for use between the frame of the hopper and the frame of an unloading outlet for a railway hopper car. The gasket has a central metal frame carrying a pair of relatively hard, continuous elastomeric seals along each edge of the frame. Each of the seals has a lip which protrudes upwardly (or downwardly) and outwardly from the body of the gasket so as to be readily compressed upon initially mating with the frames to ensure sealing even if the frames are warped. Such a gasket may be retrofitted to existing outlets.

7 Claims, 1 Drawing Sheet

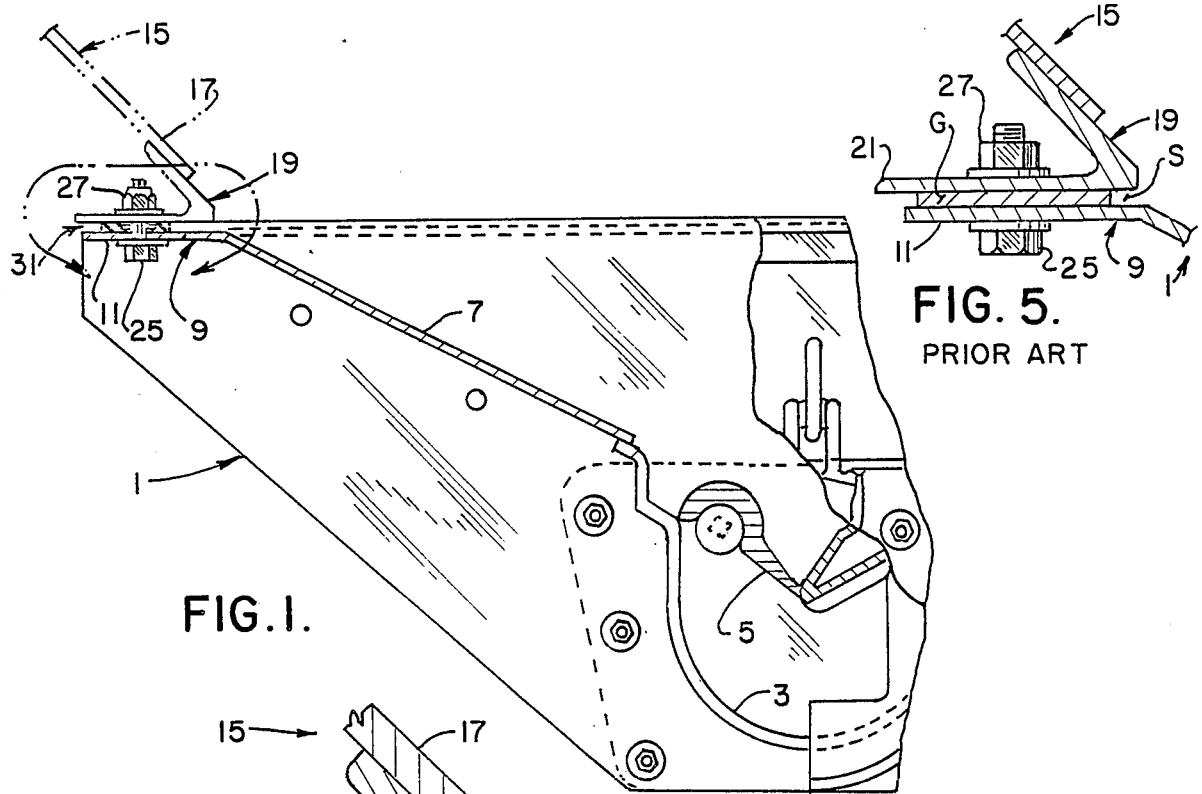
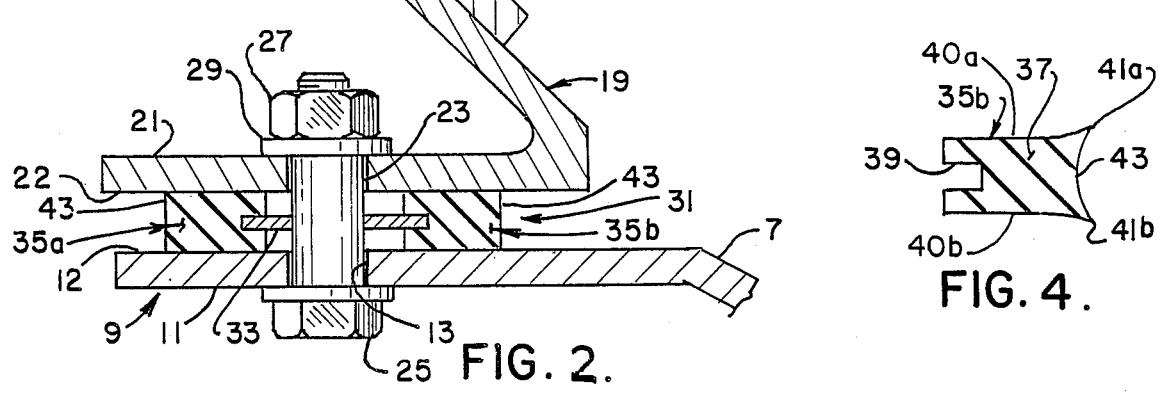
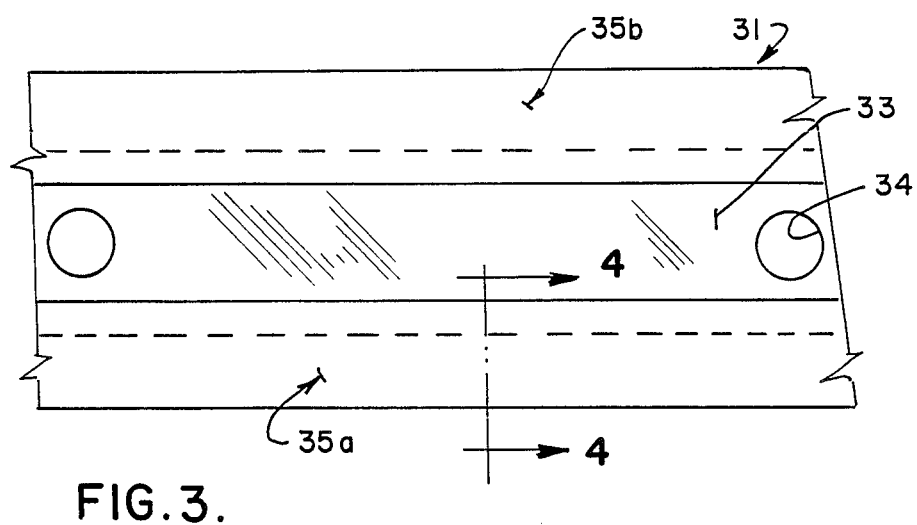

HARD GASKET FOR RETROFIT INSTALLATION ON HOPPER OUTLET/HOPPER GASKET OUTLET

This is a continuation of co-pending application Ser. No. 041,839, filed on Apr. 23, 1987, now abandoned.

BACKGROUND OF THE INVENTION

This invention relates to a gasket for a hopper outlet, and more particularly to a gasket for use with a pneumatic outlet, as utilized on a covered hopper railway car for unloading a particulate, granular, powdered, or other fluent, solid lading. Covered hopper railway cars are utilized to transport a wide variety of bulk particulate or powdered (fluent) ladings, such as plastic pellets, cement, flour, and the like. As shown in the co-assigned U.S. Pat. Nos. 3,659,752, 3,701,460, 3,715,053, 3,778,114, and 4,114,785, such covered hopper railway cars are often provided with downwardly and inwardly sloping side walls which funnel lading into an outlet attached to the bottom end of the hoppers of the covered hopper car. Such outlets are oftentimes pneumatic unloading outlets so constructed that air can be forced through the outlet in such manner as to entrain the particulate or powdered lading into the air moving through the outlet such that the entrained lading can be pneumatically conveyed from the hopper car.

As can be seen by referring to the above-noted prior art patents, the outlet is conventionally a trough-like weldment, having end walls and side walls sloping inwardly and downwardly toward a conduit through which air is drawn, and in which the lading is entrained in the moving air stream. An outlet frame is provided at the upper portion of the outlet side and end walls, with the outlet frame being generally rectangular. A similar downwardly facing hopper frame is secured to the lower reaches of the inwardly and downwardly extending hopper side and end walls. Typically, the outlet frame is bolted to the hopper frame, with a compressible (i.e., elastomeric) gasket interposed therebetween so as to provide a seal between the hopper and the outlet. This construction is illustrated in FIG. 5 (labelled prior art) of the instant drawings. As can be seen in FIG. 5, there was oftentimes a space S of at least the thickness of the gasket G between the hopper frame and the outlet frame. This space S oftentimes entrapped small quantities of the particulate or powdered lading. Also, the gasket was usually of a relatively soft elastomeric material such that lading particles could become imbedded in the gasket material or be forceably wedged between the gasket and the hopper and outlet frames.

It will be appreciated that such outlets and hopper bottoms are relatively large (e.g., 3 feet ×6 feet or more) and are made of relatively heavy gauge sheet metal weld construction. While such outlets and hopper bottoms are strong, they are not fully rigid. They are also prone to some warpage during fabrication. That is, upon bolting the outlet frame to the hopper frame, both the hopper frame and the outlet frame may tend to warp or flex (twist) relative to one another.

It is oftentimes necessary to thoroughly clean the inside of a covered hopper railway car before a lading can be onloaded so as to ensure that the new lading is not contaminated by any residue of past ladings or the like. This cleaning process may be done by a workman who enters the car and scrubs the inside of the car, utilizing air or water pressure. However, it has been found that even small quantities of certain ladings can contaminate a new lading, and it is difficult to remove all residual lading, even with thorough cleaning.

For example, a typical covered hopper railway car may carry up to about 190,000 pounds (about 5700 cubic feet) of plastic pellets. However, if the previous lading was red plastic pellets, very small residual quantities of the red pellets (e.g., only a few pellets) have been known to so contaminate a subsequent load of white plastic pellets as to render the quality of the white plastic pellets unacceptable, even though the pellets were of the same resin (e.g., polyethylene). Also, upon changing resins or resin grades even very small, residual quantities of residual resins from prior ladings may contaminate a subsequent lading. Thus, there has been a long-standing problem in constructing railway covered hopper cars which could be readily cleaned, which did not have any unnecessary crevices or the like in which particulate or powdered ladings could become lodged, and which were relatively easy to thoroughly clean.

In my earlier copending U.S. patent application Ser. No. 793,753, filed Nov. 1, 1985, now U.S. Pat. No. 4,768,684 which is herein incorporated by reference, I disclosed two different gaskets, both of which overcame the above-noted long-standing contamination and cleaning problems. One of my prior designs required that the outlet frame be machined so as to have a groove therein which would accept a soft elastomeric gasket. Upon bolting the outlet frame to the hopper frame, a tight metal-to-metal seal was formed inwardly of the gasket so as to prevent the lading from coming into contact with the gasket. However, the requirement of machining a groove in the outlet frame prevented this gasket from being retrofitted to existing outlets.

Further, in my above-noted U.S. Pat. No. 4,768,684, another seal embodiment was disclosed which may be retrofitted to existing outlets. This seal or gasket embodiment utilized an I-shaped metal spacer, tapered across its face from side-to-side, between the hopper and outlet frames with upper and lower elastomer gaskets between the web of the I-shaped spacer and the upper hopper frame and the lower outlet frame. In this manner, a continuous metal-to-metal seal was ensured between the spacer and the frames so as to prevent lading particles from being imbedded in the elastomeric gaskets, and compression of the elastomeric gaskets ensured sealing. While this I-shaped metal member resulted in substantial expense, but it did solve contamination problems and did allow retrofitting.

SUMMARY OF THE INVENTION

Among the several objects and features of the present invention may be noted the provision of a hopper outlet, such as described above, which provides a contamination-free interface between the outlet and hopper frame flanges, even when the mating surfaces of the flanges are not perfectly flat;

The provision of such a gasket which effectively seals the hopper frame relative to the outlet frame;

The provision of such a gasket which, upon compression thereof, prevents buckling of the gasket;

The provision of such a gasket which may be retrofitted to existing hopper cars without modification thereto; and The provision of such a gasket which is of durable construction, which is impervious to weather and temperature, and which has a long service life.

Other objects and features of the present invention will be in part apparent and in part pointed out hereinafter.

Briefly stated, in an unloading outlet for a railway hopper car or the like, the hopper car has a hopper frame at the lower portion of the hopper. An outlet is provided having an outlet frame which is adapted to mate with and to be secured to the hopper frame. A gasket is provided between the hopper frame and the outlet frame for effectively sealing the outlet frame to the hopper frame, and for effectively preventing entrapment of powdered or particulate ladings between the hopper frame and the outlet frame. The gasket has an elongate central metal frame carrying an elastomeric seal along each edge of the frame with the seal having a body thicker than the frame. The edges of the seal distal from the frame have a compression lip extending upwardly (or downwardly) and outwardly from the body of the seal so as to be readily compressed upon mating with the frames thereby to ensure sealing between the frames.

BRIEF DESCRIPTION OF THE DRAWINGS

FIG. 1 is a cross sectional view of a pneumatic outlet for a covered hopper railway car, utilizing a gasket of the present invention, which prevents entrapment of particulate or powdered ladings at the interface between the outlet frame and the hopper frame;

FIG. 2 is an enlarged view of a portion of FIG. 1, taken along line 2—2 of FIG. 1, illustrating the gasket of the present invention compressively installed between the outlet and hopper frames;

FIG. 3 is a top plan view illustrating on a larger scale the gasket of the present invention;

FIG. 4 is a side cross sectional view of one portion of an elastomeric seal in its uncompressed state; and FIG. 5 is a view similar to FIG. 2 of a typical prior art gasket for sealing between a pneumatic outlet and a hopper frame.

Corresponding reference characters indicate corresponding parts throughout the several views of the drawings.

DESCRIPTION OF PREFERRED EMBODIMENTS

Referring now to the drawings, a pneumatic outlet, as indicated generally by reference character 1, is shown to be attached to the lower portions of a hopper of a covered hopper railway car or the like. Pneumatic outlet 1 is generally similar to the outlet shown in the co-assigned U.S. Pat. No. 4,114,785, which is herein incorporated by reference. While a complete disclosure of this pneumatic outlet may be found in the above-noted co-assigned U.S. patent, certain of the more key components of the outlet will be herein disclosed. However, it will be understood that within the broader aspects of this invention, the exact construction of the pneumatic outlet does not, per se, constitute a part of the invention, and this invention may be used with a variety of hopper and outlet constructions.

Generally, pneumatic outlet 1 includes an air conduit 3 through which air may be drawn by means of a suction blower or the like (not shown). A control valve 5 at the bottom of outlet 1 may be selectively opened so that a particulate lading contained within a railway hopper car or the like, to which outlet 1 is secured, may fall downwardly into air conduit 3 so as to be entrained in the air stream flowing through the conduit such that the particulate lading may be air-conveyed from the outlet. It will be understood that a particulate lading may include any granular, powdered, or pelletized solid lading which will flow or can be poured. Some examples of such particulate ladings may include powdered ladings, such as flour or cement, granular ladings such as sugar, or pelletized ladings such as plastic resin pellets. However, within the broader aspects of this invention, any particulate, flowable, solid lading may be utilized.

Even more specifically, outlet 1 includes outlet slope side and end sheets or walls 7 which extend inwardly and downwardly toward control valve 5 and air conduit 3. A generally rectangular outlet frame 9 is secured to the upper edges of the side and end outlet slope sheets 7. As best shown in FIGS. 1 and 2, outlet frame 9 includes a generally horizontal flange 11, having an upwardly facing frame surface 12 (as best shown in FIG. 3). A plurality of spaced holes 13 is provided around the flange 11 for purposes as will appear.

As generally indicated at 15, a hopper is provided to which outlet 1 is attached. Hopper 15 may, for example, be a hopper in a covered railway hopper car or the like. However, those skilled in the art will recognize that outlet 1 may be applied to hoppers other than those in railway car applications. More specifically, hopper 15 includes a plurality of hopper slope sheets 17 which angle inwardly and downwardly converging toward outlet 1. A hopper frame, as generally indicated at 19, is secured (e.g., welded) to the lower margins of the hopper slope sheets 17. Hopper frame 19 is constituted by an angle-shaped hopper flange 21 which has a downwardly-facing surface 22, as best shown in FIG. 2. A plurality of spaced holes 23 are provided in hopper flange 21, with the outlet frame flange holes 13 mating with the hopper flange holes 23. These mating outlet frame and hopper frame flange holes each receive a respective bolt 25. In this manner, with nuts 27 and washers 29 applied to the bolts 25, outlet 1 may be secured to hopper 15.

In accordance with this invention, a gasket assembly, as generally indicated at 31, is provided between outlet frame 9 and hopper frame 19 so as to positively seal the outlet frame to the hopper frame in such manner as to prevent the leakage of lading from within hopper or outlet to the exterior, or to prevent atmospheric air from communicating with the interior of the hopper via the interface between the outlet frame and the hopper frame.

More specifically, basket assembly 31 is shown to comprise an elongate frame 33 of relatively stiff, thin material, such as sheet aluminum, having an elongate elastomeric gasket or seal 35a, 35b secured to each lineal edge of the frame and thereby extending perimetrically about the frame. Frame 35 has a plurality of spaced holes 34 mating with holes 13 and 23 in flanges 11 and 21 so as to receive bolts 25. Seals 35a, 35b are preferably of a relatively hard elastomer. For example, seals 35a, 35b may be of a Neoprene-type elastomer having a durometer range between about 60 and 90 (Shore A) and more preferably between about 70 and 80. However, within the broader aspects of this invention, other elastomers or synthetic resins having other durometer ranges may be used.

Each seal 35a, 35b has a solid elastomer body 37 thicker than frame 33 having a groove 39 along its one edge for receiving frame 33. At the side of body 37 opposite groove 39 distal from frame 33, each seal 35a, 35b has an upper and a lower face 40a, 40b, respectively, and a compression lip 41a, 41b (as best shown in FIG. 4) at the top and bottom margins thereof. These compression lips are integral with body 37 and extend outwardly and upwardly (or downwardly) relative to body 37, such that these compression lips are initially engaged by flanges 11 and 21 as the outlet frame 9 is bolted to hopper frame 19, even though the frames are not flat relative to one another, and even though the body 37 of seal 35a, 35b are compressed. These compression lips 41a, 41b ensure that an initial line of sealing is formed between the seals 35a, 35b and the respective faces 12 and 22 of outlet frames 9 and 19, even though there may be considerable distortion (within a limited range) therebetween.

Further, as shown in FIG. 4, each seal body 37 has a concave face 43 distal from frame 33. Upper compression lip 41a of seal body 37 extends laterally beyond concave outer face 43 and vertically above upper face 40a, and lower compression lip 41b extends laterally beyond concave outer face 43 and vertically below lower face 40b. Thus, as compression lips 41a, 41b of each seal body 37 are initially, readily compressed between flanges 9 and 19, the elastomer seal body 37 distorts and the outer face 43 of each seal body assumes a nearly vertical position (as shown in FIG. 2), thus sealing between the frames and preventing particles of lading from becoming entrapped between the gasket bodies 37 and the frame flanges.

Also, because of the provision of compression lips 41a, 42b, as heretofore described, a relatively high durometer elastomer can be used for seal body 37, and yet only moderate compressive forces, as applied by bolts 25, are required to initially deflect the compression lips and to make a seal. By permitting the use of a high durometer elastomer, the tendencies of a granular lading to become pressed or lodged in seals 35a, 35b or between the seals and the flanges 9 and 19 are markedly reduced.

Frame 33, being of metal, is relatively stiff (as compared to elastomer seals 35a, 35b) in both vertical and lateral direction. Thus, frame 33 prevents both lateral and vertical shifting or buckling (as viewed in FIG. 2) of seals 35a, 35b and holds the seals parallel to one another and prevents shifting of the seals on the frames as the gasket 31 is compressed between frames 9 and 19.

Referring now to FIG. 5, a typical prior art gasket heretofore utilized to seal outlet 1 to hopper 15 is shown. This prior art gasket, as indicated at G, typically consisted of a compressible, elastomeric strip which was interposed between outlet frame 9 and hopper frame 19, and was sealably compressed by means of bolts 25. However, a space, as indicated at S, oftentimes resulted between the inner portions of the hopper frame 19 and the outlet frame 9 such that particulate lading would become lodged within this space. Because the prior elastomeric strips were required to be of a relatively low durometer rating so as to enable compression between the hopper and outlet frames, granular ladings would tend to become lodged between the frames and the elastomeric strips, or forceably pushed into the relatively soft elastomer. Such lodged lading within space S and within the elastomer strip was difficult to remove during clean-out of the hopper car and posed a threat to contaminate subsequent ladings. The present invention overcomes these long-standing problems by providing a hard elastomer which prevents lading entrappment and/or imbedment and yet requires compressive forces no higher than prior softer seals or gaskets, and which readily accommodates variations in flatness.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a hopper for storing a particulate, fluent lading material, the hopper having an opening in the bottom thereof through which the material is discharged from the hopper and a hopper frame about the opening; and, an outlet assembly secured to the bottom of the hopper about the opening for material discharged through the opening to be entrained in a fluid medium and carried away from the hopper, the outlet assembly having an outlet frame secured to the hopper frame to attach the outlet assembly to the hopper, the improvement comprising: a compressible gasket fitting between the hopper frame and the outlet frame for forming a seal between the hopper and the outlet assembly, the gasket extending perimetrically about the opening to form a continuous seal completely sealing the opening, the gasket having an inner sealing section adjacent the opening, an outer sealing section, and an intermediate section between the inner and outer sections, the inner and outer sections each being relatively thicker than the intermediate section and compressed when the outlet assembly is attached to the hopper, each of the inner and outer sections having an inner face with one of the inner faces being substantially orthogonal to the intermediate section for the transition in thickness therebetween to be abrupt, the inner section having an outer edge adjacent the opening with the portion of the inner section adjacent the outer edge being thicker than the portion of the inner section adjacent the intermediate section, the inner section further having a concave outer face, the degree of concavity being such that when the gasket is compressed, the outer face becomes substantially perpendicular with respect to both the hopper frame and the outlet frame thereby eliminating any spaces between the gasket and the hopper frame and the gasket and the assembly frame in which particles of material can be trapped and contaminate material subsequently stored in the hopper.

2. The improvement of claim 1 wherein the inner face of the inner section is substantially orthogonal to the intermediate section thereby creating an abrupt transition therebetween.

3. The improvement of claim 1 wherein the inner face of the outer section is substantially orthogonal to the intermediate section thereby creating an abrupt transition therebetween.

4. The improvement of claim 1 wherein the inner face of both the inner and outer sections are substantially orthogonal to the intermediate section thereby creating an abrupt transition therebetween.

5. The improvement of claim 1 wherein the inner and outer sections of the gasket are separately formed from the intermediate section and each of the inner and outer sections has means for joining the respective section to the intermediate section.

6. The improvement of claim 5 wherein the inner face of each of the inner and outer sections has a groove therein sized to receive a respective outer margin of the intermediate section.

7. The improvement of claim 1 wherein the hopper and the outlet assembly have flanges which are connected to each other to attach the outlet assembly to the hopper, the gasket fitting between the flanges, and the width of the gasket being less than the width of the flanges.

* * * * *